(12) United States Patent
Kanamori

(10) Patent No.: US 11,385,845 B2
(45) Date of Patent: Jul. 12, 2022

(54) INFORMATION PROCESSING METHOD, INFORMATION PROCESSING APPARATUS, AND STORAGE MEDIUM

(71) Applicant: CANON KABUSHIKI KAISHA, Tokyo (JP)

(72) Inventor: Hideyuki Kanamori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/337,241

(22) Filed: Jun. 2, 2021

(65) Prior Publication Data
US 2021/0382670 A1  Dec. 9, 2021

(30) Foreign Application Priority Data
Jun. 8, 2020  (JP) .............................. JP2020-099470

(51) Int. Cl.
*G06F 3/12* (2006.01)

(52) U.S. Cl.
CPC .......... *G06F 3/1248* (2013.01); *G06F 3/1204* (2013.01); *G06F 3/1258* (2013.01); *G06F 3/1288* (2013.01)

(58) Field of Classification Search
None
See application file for complete search history.

(56) References Cited

U.S. PATENT DOCUMENTS

| 7,619,758 B2* | 11/2009 | Kujirai | G06F 3/1204 358/1.14 |
| 8,032,661 B2* | 10/2011 | Anderson | H04N 1/32502 710/2 |
| 8,867,077 B2* | 10/2014 | Kobayashi | G06F 3/1208 358/1.14 |
| 10,277,765 B2* | 4/2019 | Morimoto | H04N 1/00941 |
| 2006/0244994 A1* | 11/2006 | Konnai | G06F 3/126 358/1.15 |
| 2012/0127512 A1* | 5/2012 | Kay | G06F 3/1275 358/1.15 |
| 2018/0220025 A1 | 8/2018 | Morimoto | |

FOREIGN PATENT DOCUMENTS

JP  2006-099747 A  4/2006

* cited by examiner

*Primary Examiner* — Paul F Payer
(74) *Attorney, Agent, or Firm* — Canon U.S.A., Inc. IP Division

(57) ABSTRACT

Proper print processing is performed in a print system in which a first information processing apparatus capable of communicating with a printer and a second information processing apparatus capable of communicating with the printer via the first information processing apparatus are connected via a network. To this end, an information processing method executed by the first information processing apparatus includes: obtaining setting information on communications of the printer, obtaining information on a status of the printer from the printer, and executing predetermined processing. The predetermined processing is executed while waiting to communicate with the printer, in a case where the setting information indicates that the printer is ready to communicate with the second information processing apparatus and that the second information processing apparatus generates a PDL.

13 Claims, 15 Drawing Sheets

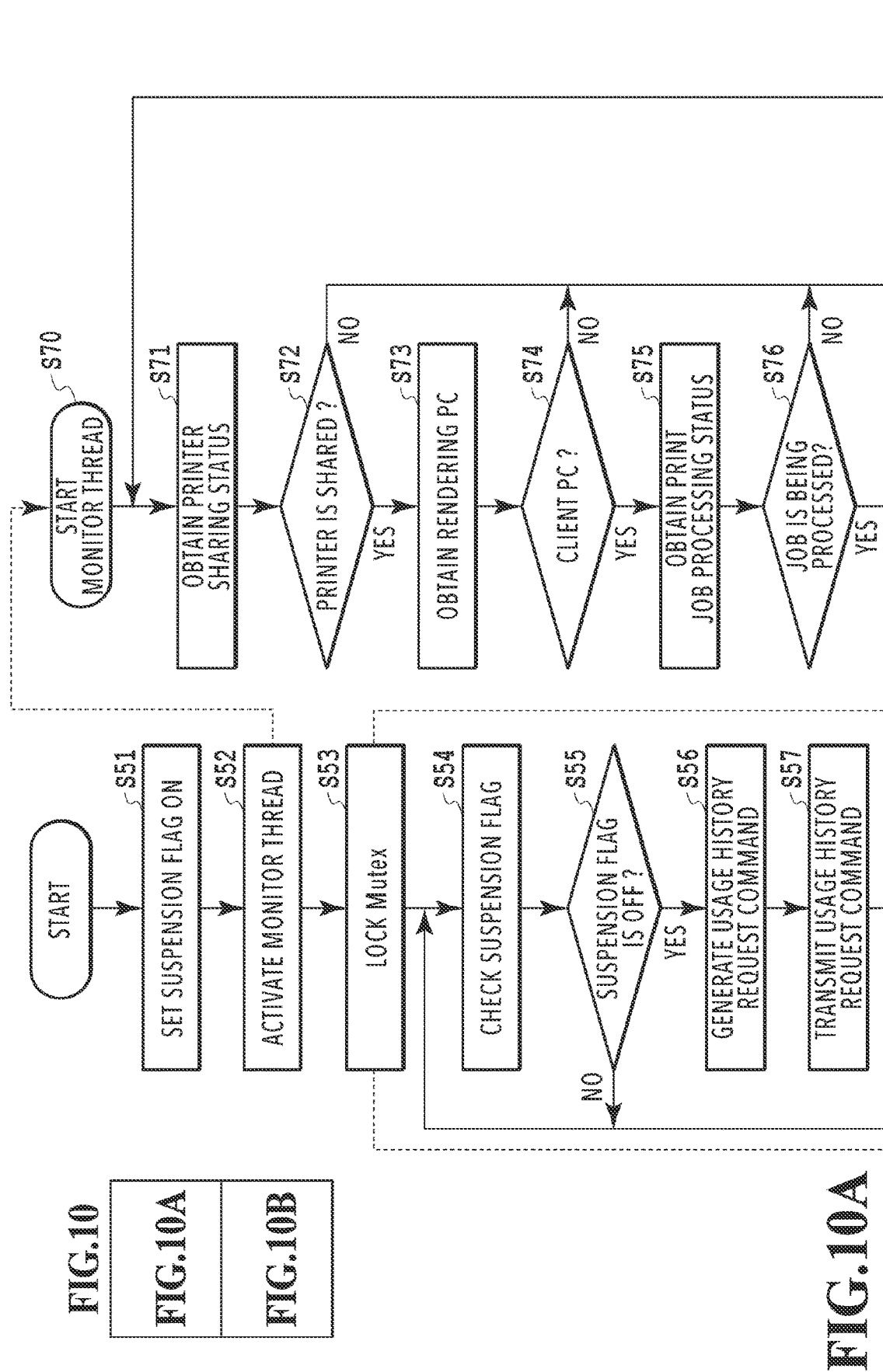

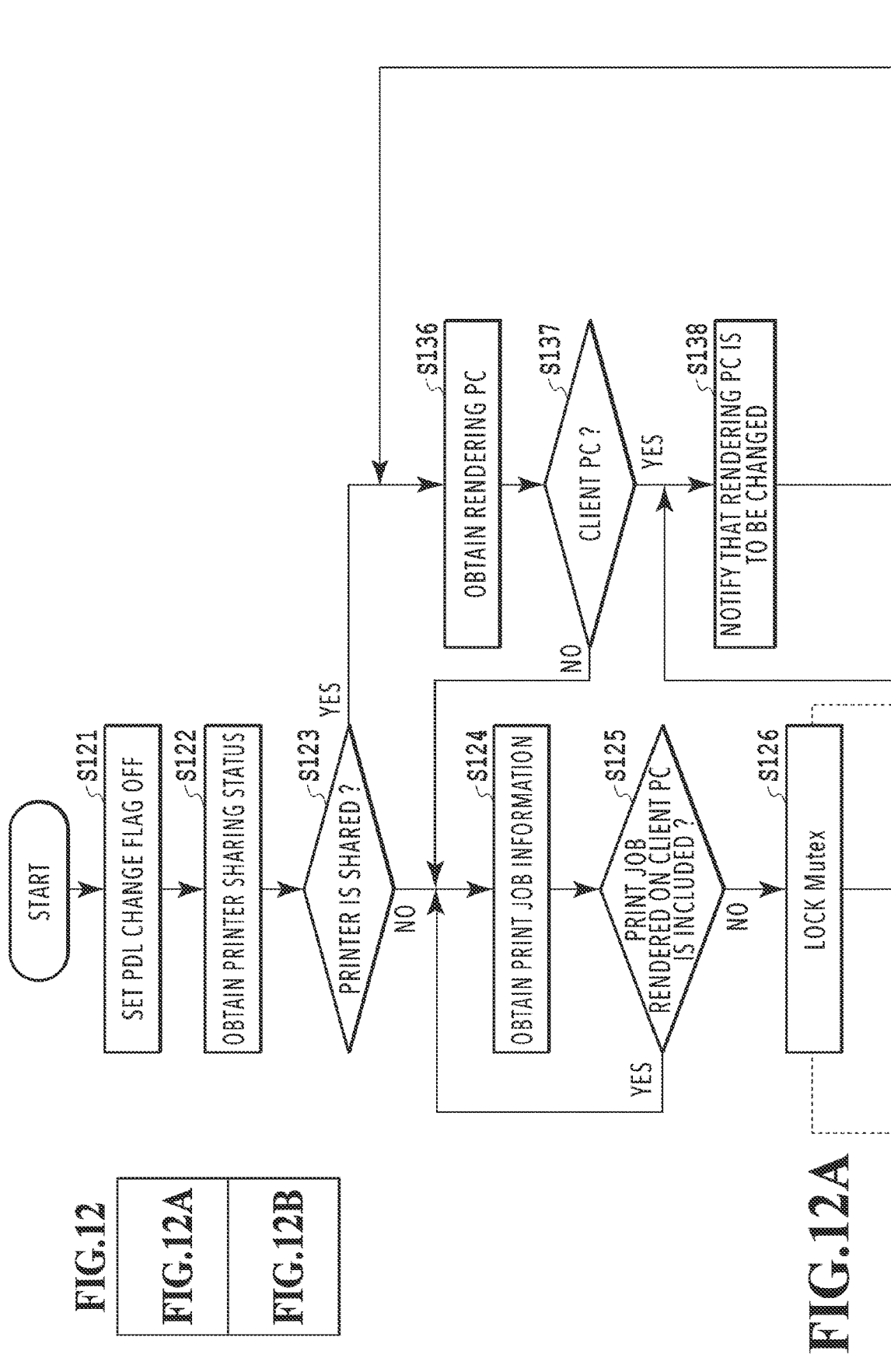

INFORMATION PROCESSING METHOD, INFORMATION PROCESSING APPARATUS, AND STORAGE MEDIUM

BACKGROUND

Field of the Disclosure

The present disclosure relates to an information processing method, an information processing apparatus, and a storage medium

Description of the Related Art

Network systems in which a device such as a printer is shared by a plurality of information processing apparatuses connected to each other via a network have been practically used. Japanese Patent Laid-Open No. 2006-99747 discloses a print system that allows a printer connected to a particular personal computer (a server PC) to be used by a different personal computer (a client PC) connected via a network.

In such a print system using a network, print data created on a client PC is converted into a printer description language (PDL) by either the client PC or the server PC. Then, a language monitor in the server PC transmits the generated PDL to the printer, and an image is printed.

However, in particular operating systems (OS) such as recent Windows (registered trademark), for example, a language monitor provided by the vendor may not be activated for a print job received from the client PC. In such a case, a program such as a management tool that is activated on the server PC to keep track of the usage status of the printer cannot perform mutual exclusion with the client PC. Also, some systems do not have a language monitor in the first place, and mutual exclusion with the client PC cannot be performed in such cases as well. As a result, communications with the printer based on a program such as a printer driver and communications with the printer based on a program such as a management tool may occur in a mixed manner, hindering proper communications.

SUMMARY

Embodiments of the present disclosure have been made to solve the above issues and enables communications to be performed properly in a print system in which a first information processing apparatus capable of communicating with a printer and a second information processing apparatus capable of communicating with the printer via the first information processing apparatus are connected to each other via a network. In a first aspect of the present disclosure, there is provided an information processing method executed by a first information processing apparatus capable of communicating with a printer in a print system in which the first information processing apparatus and a second information processing apparatus capable of communicating with the printer via the first information processing apparatus are connected via a network, the information processing method comprising: obtaining setting information on communications of the printer; obtaining information on a status of the printer from the printer by communicating with the printer, the obtaining the information on the status of the printer being started based on an input of a command from a user; and executing predetermined processing while waiting to communicate with the printer, in a case where the setting information indicates that the printer is ready to communicate with the second information processing apparatus via the first information processing apparatus and that the second information processing apparatus generates a printer description language (PDL) based on print data, wherein the obtaining of the information on the status of the printer and the executing of the predetermined processing are executed by respective different programs on the first information processing apparatus.

In a second aspect of the present disclosure, there is provided a non-transitory computer-readable storage medium including program which causes a computer of a first information processing apparatus to perform the following: obtaining setting information on communications of a printer; obtaining information on a status of the printer from the printer by communicating with the printer, the obtaining the information on the status of the printer being started based on an input of a command from a user; and executing predetermined processing while waiting to communicate with the printer, in a case where the setting information indicates that the printer is ready to communicate with a second information processing apparatus via the first information processing apparatus and that the second information processing apparatus generates a printer description language (PDL) based on print data, wherein the obtaining of the information on the status of the printer and the executing of the predetermined processing are executed by respective different programs on the first information processing apparatus.

In a third aspect of the present disclosure, there is provided an information processing apparatus which is interposed between a printer and a different information processing apparatus which is connected to the information processing apparatus via a network and which is capable of controlling communications between the printer and the different information processing apparatus, the information processing apparatus comprising: a setting information obtaining unit that obtains setting information on communications of the printer; a status information obtaining unit that obtains information on a status of the printer from the printer by communicating with the printer based on an input of a command from a user; and an execution unit that causes the status information obtaining unit to wait to communicate with the printer and executes predetermined processing in a case where the setting information indicates that the printer is ready to communicate with the different information processing apparatus via the information processing apparatus and that the different information processing apparatus generates a printer description language (PDL) based on print data, wherein the obtaining of the information on the status of the printer by the status information obtaining unit and the executing of the predetermined processing by the execution unit are executed by respective different programs on the information processing apparatus.

Further features of the present disclosure will become apparent from the following description of exemplary embodiments with reference to the attached drawings.

BRIEF DESCRIPTION OF THE DRAWINGS

FIG. 10, which includes FIGS. 10A and 10B, is a flowchart showing processing executed by the management tool of the server PC:

FIG. 12, which includes FIGS. 12A and 12B, is a flowchart showing processing executed by the management tool of the server PC.

DESCRIPTION OF THE EMBODIMENTS

Embodiments of the present disclosure are described in detail below with reference to the attached drawings.

First Embodiment

Figure 1:
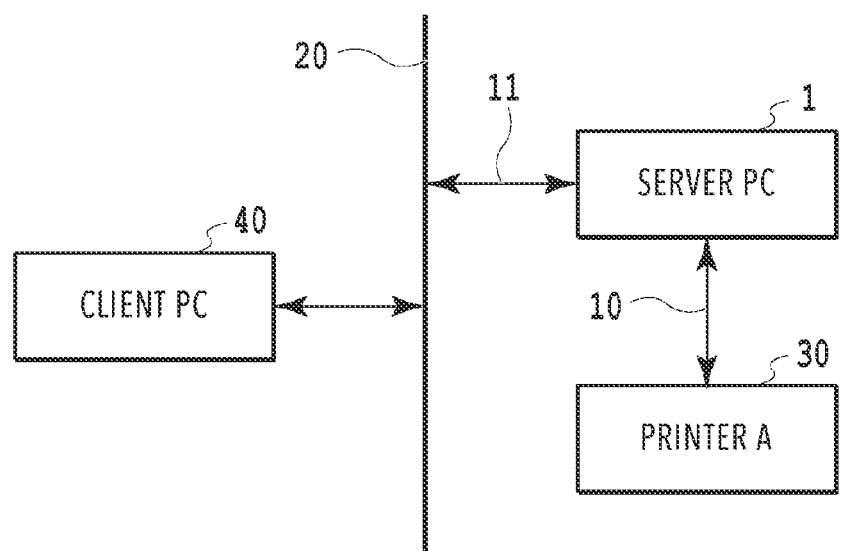
FIG. 1 is a schematic diagram of a print system.

FIG. 1 is a schematic diagram of a print system used in the present embodiment. A server PC 1 and a client PC 40 can communicate with each other via a network 20. A printer A 30 is a local printer directly connected to the server PC 1 via a communication interface 10. Examples of a network usable as the network 20 include a local area network (LAN) and a wide area network (WAN). The connection to the network 20 may be a wired or wireless form, and also, both of these manners may coexist. The communication interface 10 may be any form as long as it allows mutual communications, and for example, Universal Serial Bus (USB) may be used.

In the present embodiment, a PC directly connected to the printer A 30 is referred to as the server PC 1, and a PC that can use the printer A 30 via the server PC 1 is referred to as the client PC 40 for the sake of convenience, but both of them may have typical functions as a PC.

Figure 2:
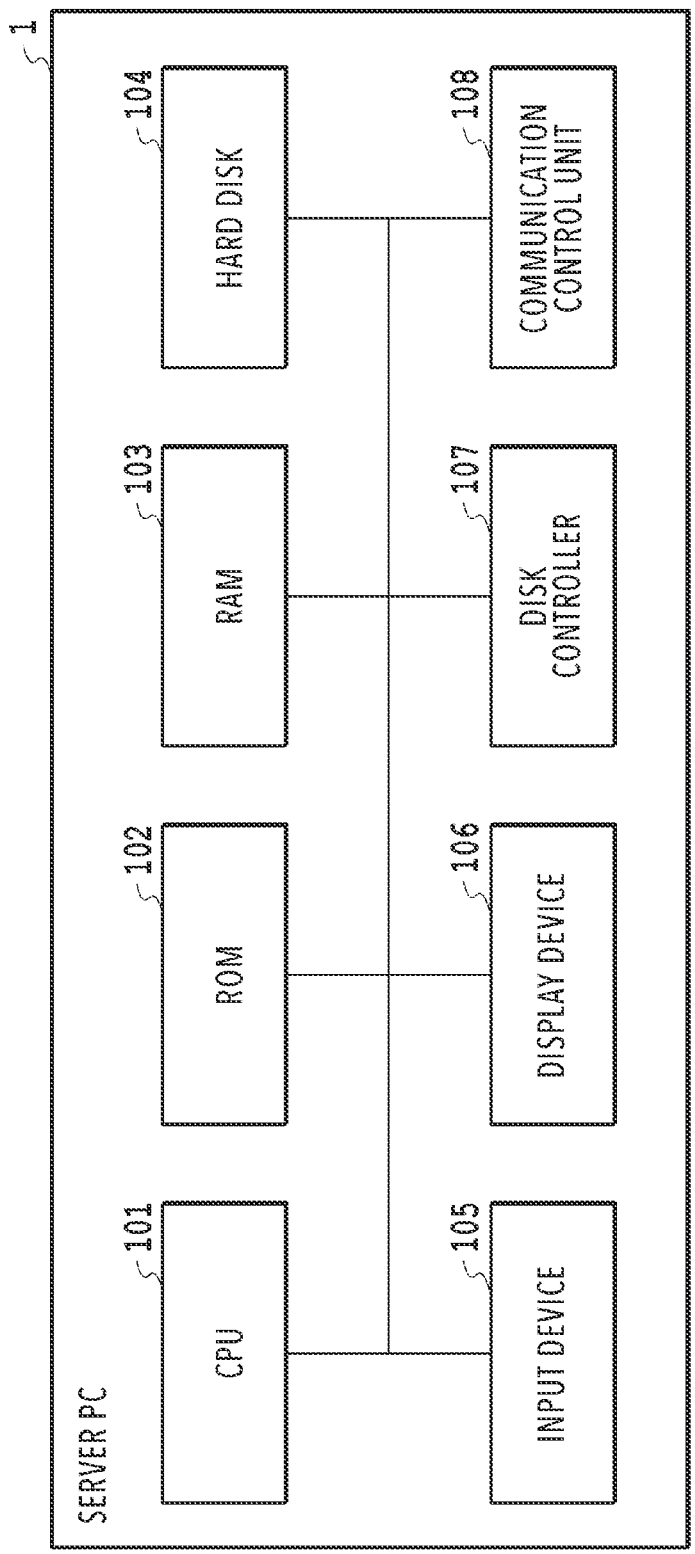
FIG. 2 is a block diagram illustrating the hardware configuration of a server PC.

FIG. 2 is a block diagram illustrating the hardware configuration of the server PC 1. A CPU 101 performs overall control of the apparatus according to programs stored in a ROM 102 or a hard disk 104, using a RAM 103 as a work area. For example, the CPU 101 loads an OS or application installed in the hard disk 104 to the RAM 103, and executes various programs according to the programs read out.

An input device 105 is for example a keyboard and/or a mouse, and is a device for receiving instructions from a user. A display device 106 is for example a cathode-ray tube (CRT) display, and displays information to notify a user. In a case where a flexible disk is inserted, a disk controller 107 controls data access to the flexible disk as instructed by the CPU 101. A communication control unit 108 controls communications with the externally-connected printer A 30 as instructed by the CPU 101.

The flowcharts shown in FIGS. 7, 8, 10A to 12B to be described later are executed by the CPU 101 according to the programs of the OS loaded to the RAM 103, using the RAM 103 as a work area. Although the above description is provided as the hardware configuration of the server PC 1, the client PC 40 may have the same configuration. In the present embodiment, the CPU 101, the ROM 102, the RAM 103, and the like form a computer for the server PC as an information processing apparatus of the present embodiment.

Figure 3:
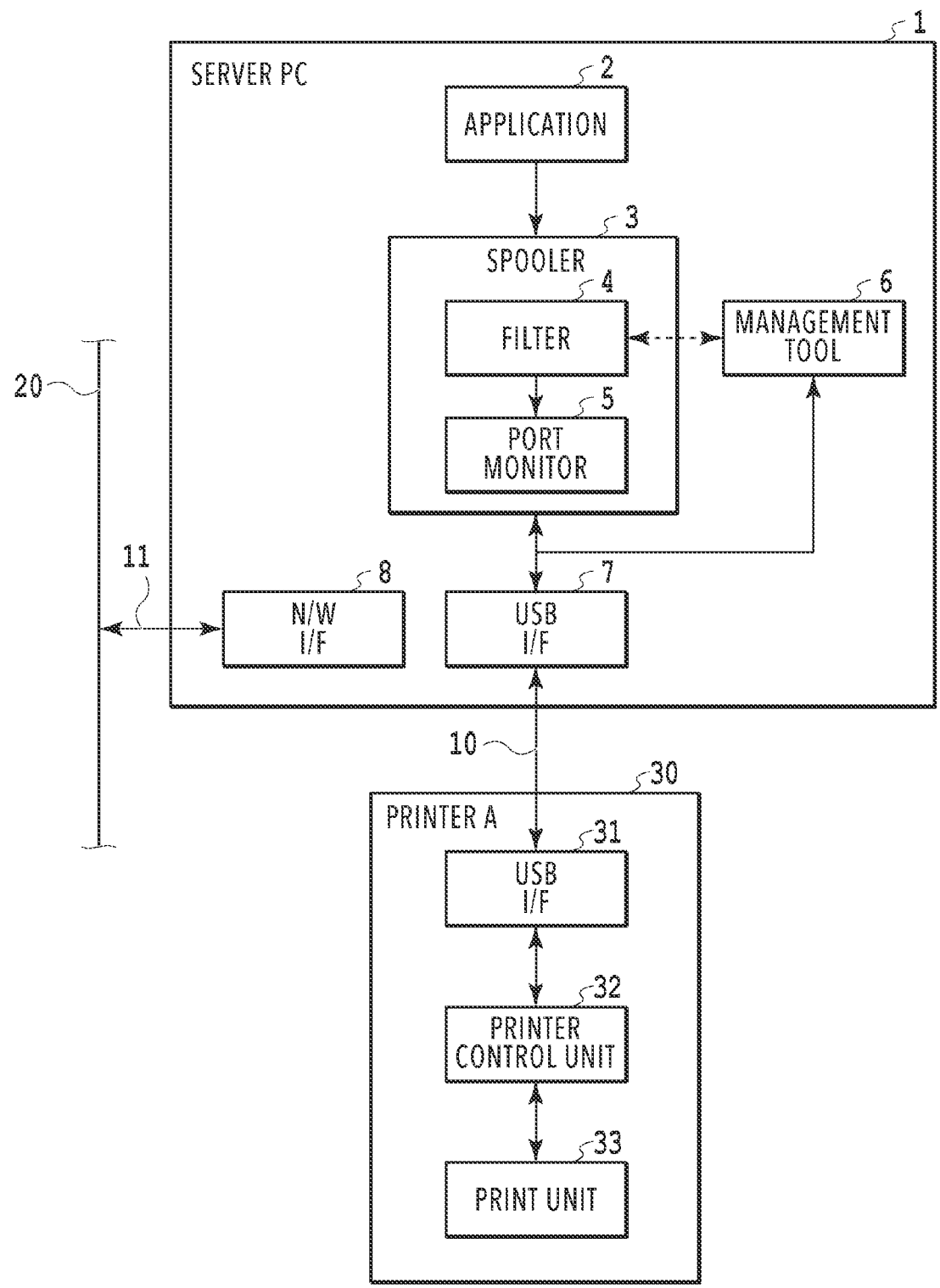
FIG. 3 is a block diagram showing the configuration of functions in the server PC and a printer A.

FIG. 3 is a block diagram showing the configuration of functions in the server PC 1 and the printer A 30. The function blocks shown in the server PC 1 are managed by the OS installed in the server PC 1. The present embodiment assumes a mode where Windows 10 (registered trademark) is used as the OS and the V4 architecture is used as a print system. In the V4 architecture, the client PC 40 has no language monitor capable of keeping track of communications performed by a management tool 6 to be described later. Note that the V3 architecture may be used as a print system. In a case where the V3 architecture is used, the client PC 40 has a language monitor, but the issue to be solved by the present disclosure may occur in a case such as where the language monitor is disabled.

An application 2 places a print job on a generated image into a spooler 3 as instructed by a user.

The spooler 3 includes a filter 4 and a port monitor 5. The spooler 3 is a function implemented by the OS in the server PC 1. The filter 4, on the other hand, is a function provided by a printer driver provided by the vendor of the printer A 30. The filter 4 manages a print job using a print queue, and meanwhile, converts print data in the print job into a printer description language (PDL). The port monitor 5 transmits the PDL generated by the spooler 3 to the printer A 30 via a USB interface (I/F) 7.

The management tool 6 is a function implemented by a program provided by the vendor of the printer A 30, and manages the history and progress of print processing executed by the printer A 30. In the present embodiment, the management tool 6 is a program different from the printer driver. For example, the management tool 6 generates a command to request information on the history of print processing as instructed by a user, and transmits the command to the printer A 30 via the USB I/F 7. The management tool 6 receives the information on the history of print processing from the printer A 30, and displays the received information on the display device 106 (see FIG. 2).

The transmission of a PDL by the port monitor 5 and the transmission and reception of management information by the management tool 6 are both performed via the USB I/F 7, but in the present embodiment, control is performed such that these pieces of information may not be communicated in a mixed manner. Details will be given later on this control.

An NM I/F 8 is an interface through which the server PC 1 delivers and receives information to and from other devices connected to the network 20.

As described earlier, the spooler 3 is a function implemented by the OS in the server PC 1, and is not a function implemented by the program provided by the vendor of the printer A 30. For this reason, in the present embodiment, the spooler 3 cannot control the communications with the management tool 6, and therefore cannot execute the mutual exclusion to be described later. The filter 4, on the other hand, is a function implemented by the program provided by the vendor of the printer A 30 like the management tool 6, and therefore can control the communications with the management tool 6 and execute the mutual exclusion to be described later.

The printer A 30 includes a USB I/F 31, a printer control unit 32, and a print unit 33. The USB I/F 31 is an interface for delivering and receiving information to and from the server PC 1. The print unit 33 is an engine part of the printer A 30 and is controlled by the printer control unit 32. The printer control unit 32 performs operations such as causing the print unit 33 to print an image based on a PDL received from the server PC 1, obtaining history information based on a history information command received from the server PC 1, and transmitting the history information to the server PC 1 via the USB IF 31.

Figure 4A:
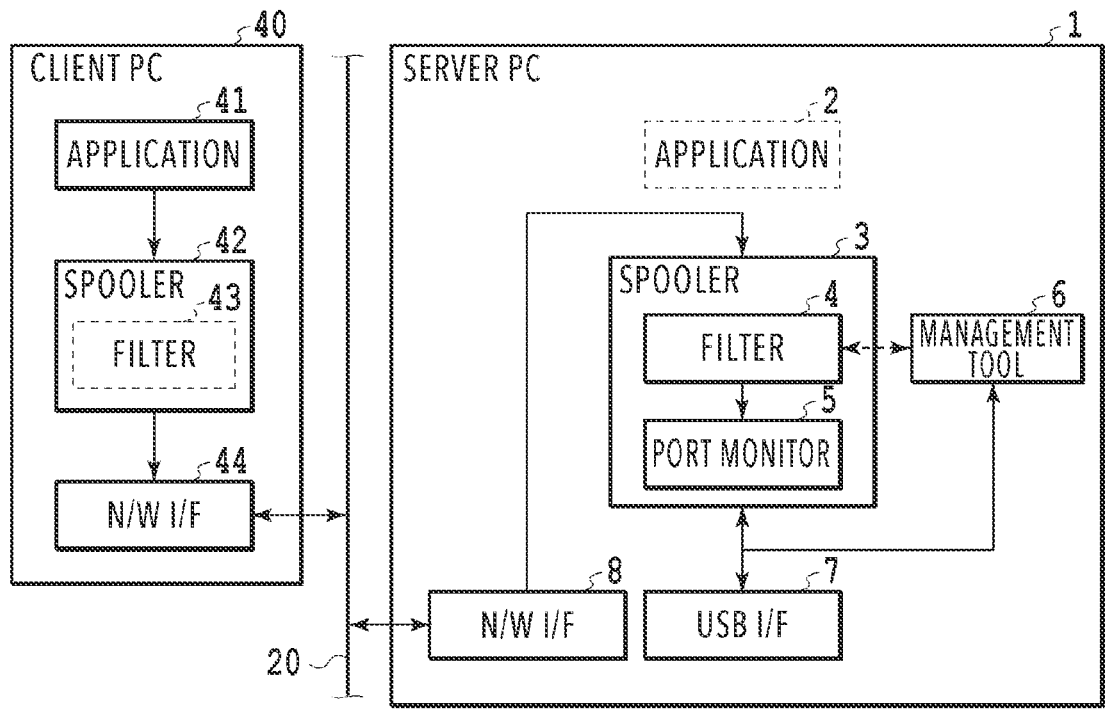
FIGS. 4A and 4B are each a block diagram showing the configuration of functions in a client PC and the server PC.
Figure 4B:
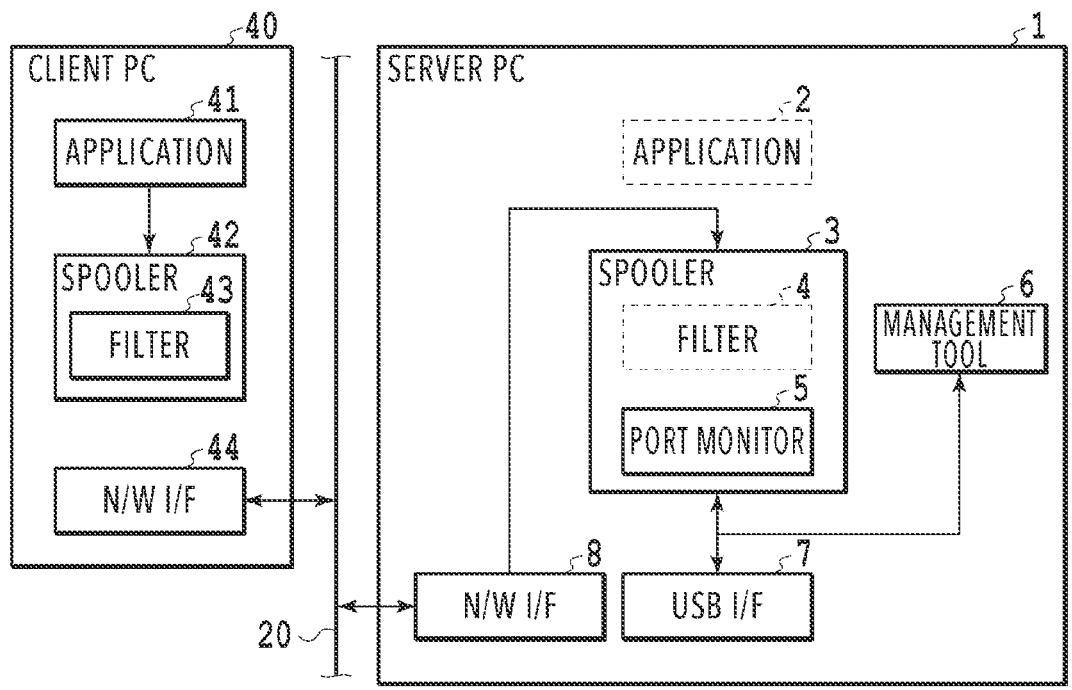

FIGS. 4A and 4B are diagrams showing a control configuration in which a user of the client PC 40 causes the printer A 30 to print an image generated on the client PC 40. Although omitted in FIGS. 4A and 4B, the printer A 30 illustrated in FIG. 1 is connected to the server PC 1 via the USB I/F 7.

The client PC 40 has an application 41, a spooler 42, and an NM I/F 44. The spooler 42 includes a filter 43. The functions of the application 41, the filter 43, and the NM I/F 44 are the same as those of the application 2, the filter 4, and the NM I/F 8 in the server PC 1, respectively. Although the print system shown includes the server PC 1 and one client PC 40, more PCs may be connected to the network 20.

In the print system of the present embodiment, regarding a printing based on a print job created (generated) on the client PC 40, a user of the server PC 1 can set whether the print data is to be converted into a PDL by the server PC 1 or the client PC 40.

FIG. 4A shows a case where the server PC 1 receives print data in a print job created on the client PC 40 and converts the print data into a PDL. In this case, the spooler 42 of the client PC 40 does not activate the filter 43 and transmits the print job generated in the application 41 to the server PC 1. The spooler 3 of the server PC 1 activates the filter 4, which then converts the print data included in the print job received from the client PC 40 into a PDL sequentially and places the PDL into the port monitor 5. The port monitor 5 transmits the received PDL to the printer A 30 via the USB I/F 7.

Note that, after receiving the print data from the spooler 3 and before converting the print data into a PDL, the filter 4 performs mutual exclusion by locking a mutex that the filter 4 shares with the management tool 6. The filter 4 performs PDL conversion with mutual exclusion in effect, and hands the converted data over to the spooler 3. Thus, the spooler 3 transmits the print job to the printer A 30 in a state where mutual exclusion is in effect. The filter 4 cancels the mutual exclusion after transmitting the print job to the printer A 30.

In this way, in a case where the spooler 3 of the server PC 1 performs PDL conversion, there is a timing at which the filter 4 can control the management tool 6 before a print job received from the client PC 40 is transmitted to the printer A 30. Thus, the filter 4 and the management tool 6 of the server PC 1 can perform mutual exclusion of each other's processing so that data transmission and reception via the USB I/F 7 do not occur at the same time in a mixed manner. The mutual exclusion will be described later.

FIG. 4B shows a case where the client PC 40 performs PDL conversion of print data in a print job created in the client PC 40 before transmitting the print job to the server PC 1. In this case, the spooler 42 of the client PC 40 activates the filter 43, which then converts the print data included in the print job generated in the application 41 into a PDL sequentially. Then, the client PC 40 transmits a print command and the generated PDL together as a print job to the server PC 1 via the NM I/F 44. The spooler 3 of the server PC 1 does not activate the filter 4 and places the PDL received from the client PC 40 into the port monitor 5. The port monitor 5 transmits the PDL placed thereinto to the printer A 30 via the USB I/F 7.

In this way, in a case where the spooler 42 of the client PC 40 generates a PDL, there is no timing at which the filter 4 can control the management tool 6 before the print job received from the client PC 40 is transmitted to the printer A 30. Thus, the management tool 6 of the server PC 1 cannot perform mutual exclusion with the filter 4 using an existing method. Thus, the management tool 6 of the present embodiment performs suspension control instead of the mutual exclusion in a period during which a printing operation is performed based on a print job issued from the client PC 40. The suspension control is to suspend transmission and reception for the processing performed by the management tool 6 itself and will be described in detail later.

Figure 5:
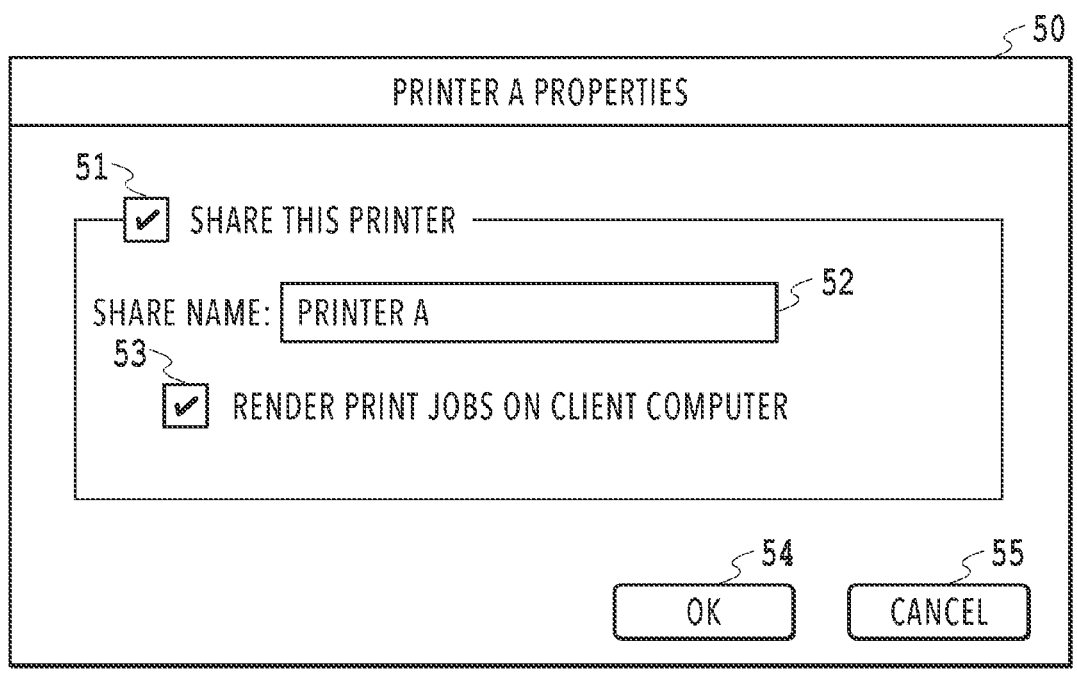
FIG. 5 is a diagram showing a printer sharing settings screen for the printer A.

FIG. 5 is a diagram showing a printer sharing settings screen for the printer A 30. A user of the server PC 1 can open a settings screen 50 shown in FIG. 5 from a printer properties screen in the OS, and set various settings thereon.

On the settings screen 50, a check box 51 is a box for setting whether the printer A 30 is to be shared with other PCs connected to the server PC 1 via the network. In the present embodiment, a state where the server PC 1 shares the printer A 30 with a different apparatus is a state where not only communications between the printer A 30 and the server PC 1 but also communications between the printer A 30 and the different apparatus via the server PC 1 are allowed. In other words, in a state where the server PC 1 shares the printer A 30 with a different apparatus, the server PC 1 transmits data received from the different apparatus to the printer A 30. In such events, the server PC 1 may transmit data newly generated based on the data received from the different apparatus or data generated by processing the data received from the different apparatus to the printer A 30.

Once an OK button 54 is pressed with the check box 51 being checked, the printer A 30 is shared between the server PC 1 and the client PC 40. A text box 52 is a box for editing the share name of the printer A 30 to share. A check box 53 is a box for setting whether a PDL is to be generated by the client PC 40 or the server PC 1. Once the OK button 54 is pressed with the check box 53 being checked, the client PC 40 that has created a print job generates a PDL in the print processing performed after that. In a case where the OK button 54 is pressed with the check box 53 being unchecked, the server PC 1 generates a PDL in the print processing performed after that. In an event where a Cancel button 55 is pressed, the settings are disabled whether the check boxes 51 and 53 are checked or unchecked. The check/uncheck states in the check boxes are saved as setting information on the printer A 30, and are read out as necessary.

Figure 6:
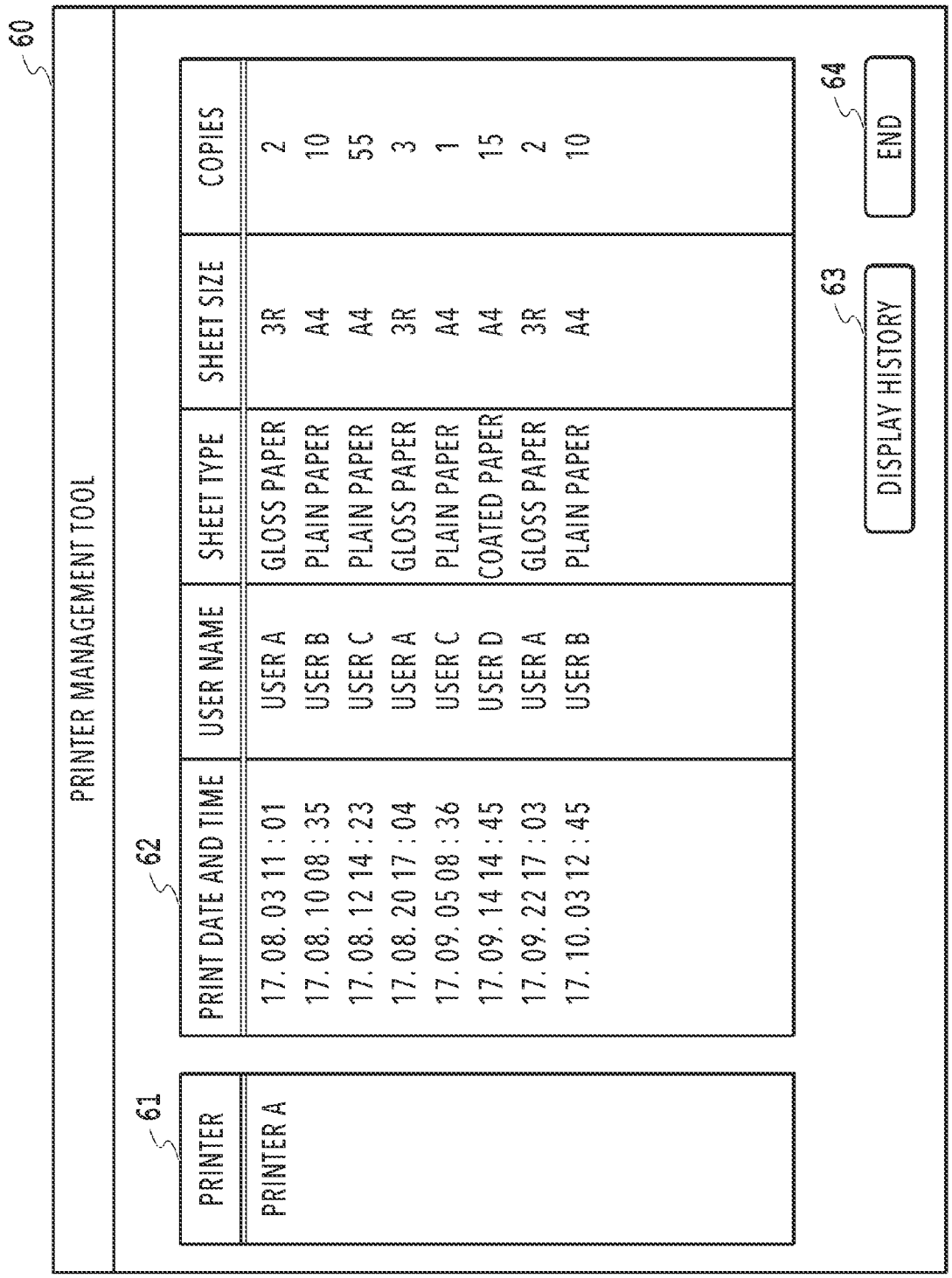
FIG. 6 is a diagram showing a usage history display screen.

FIG. 6 is a diagram showing a usage history display screen 60 displayed on the display device 106 by the management tool 6 of the server PC 1. Displayed in a printer selection list 61 is the name(s) of the printer(s) connected to the server PC 1. Although FIG. 6 depicts a case where only the printer A 30 is USB-connected, a plurality of printer names are displayed in a case where a plurality of printers are connected.

Once a user selects one printer from the printer(s) displayed in the printer selection list 61 and presses a Display History box 63 at the lower right section of the screen, the management tool 6 requests the selected printer for information on the history of print processing. Then, after receiving the information on the history of print processing from the printer, the management tool 6 displays a usage history list 62 based on the information received. FIG. 6 shows a case where the print date and time, the username, the sheet type, the sheet size, and the number of copies are displayed as information on each print process performed by the printer A 30. Once a user presses an End button 64, the management tool 6 closes the usage history display screen 60.

Figure 7:
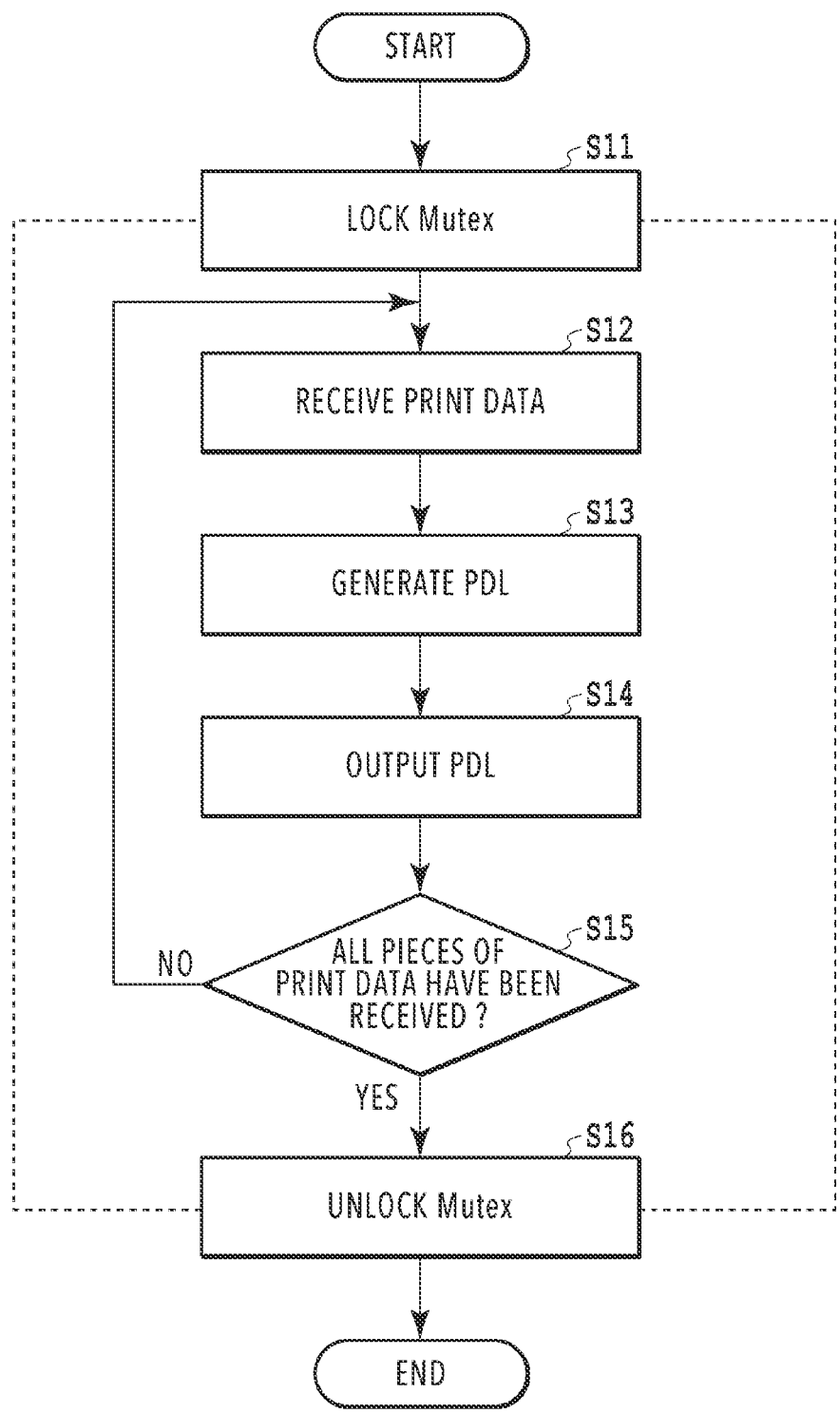
FIG. 7 is a flowchart showing processing executed by a filter of the server PC.

FIG. 7 is a flowchart illustrating processing executed by the filter 4 of the server PC 1 in a case where the server PC 1 generates a PDL. This processing is started by the spooler 3 activating the filter 4 based on receiving a print job from the client PC 40.

Once this processing is started, in S11 the filter 4 first locks the mutex shared with the management tool 6. This prohibits the management tool 6 to perform any transmission and reception with the printer A 30.

In S12, the filter 4 receives print data from the spooler 3.

In S13, the filter 4 generates a PDL based on the print data received.

In S14, the filter 4 outputs the PDL generated in S13. Then, the spooler 3 transmits the PDL outputted by the filter 4 to the printer A 30 via the port monitor 5 and the USB I/F 7.

In S15, the filter 4 determines whether all the pieces of print data have been received from the spooler 3. If the filter 4 determines that there is still a piece of print data to be received, the filter 4 returns to S12 to receive the next piece of print data from the spooler 3. If the filter 4 determines that all the pieces of print data have been received, the filter 4 proceeds to S16.

In S16, the filter 4 unlocks the mutex locked in S11. This enables the management tool 6 to perform transmission and reception with the printer A 30. The processing is thus ended.

A mutex is a tool used between the filter 4 and the management tool 6 for mutual exclusion. Locking a mutex by one of the filter 4 and the management tool 6 prohibits the other to perform any transmission and reception with the printer A 30, and unlocking the mutex permits the transmission and reception. The filter 4 and the management tool 6 each lock the mutex before starting processing and unlocks the mutex after completing the processing. This helps to prevent information for the filter 4 and information for the management tool 6 from being transmitted or received at the same time via the USB I/F 7.

In the present embodiment, while the filter 4 is performing PDL processing, even if the management tool 6 receives a request for information on the history of print processing regarding the printer A 30, the management tool 6 cannot transmit this information to the printer A 30. The management tool 6 has to wait until the mutex is unlocked by the filter 4. Then, after the filter 4 unlocks the mutex in S16, the management tool 6 now locks the mutex and transmits a request command to the printer A 30 and receives usage history information from the printer A 30.

Figure 8:
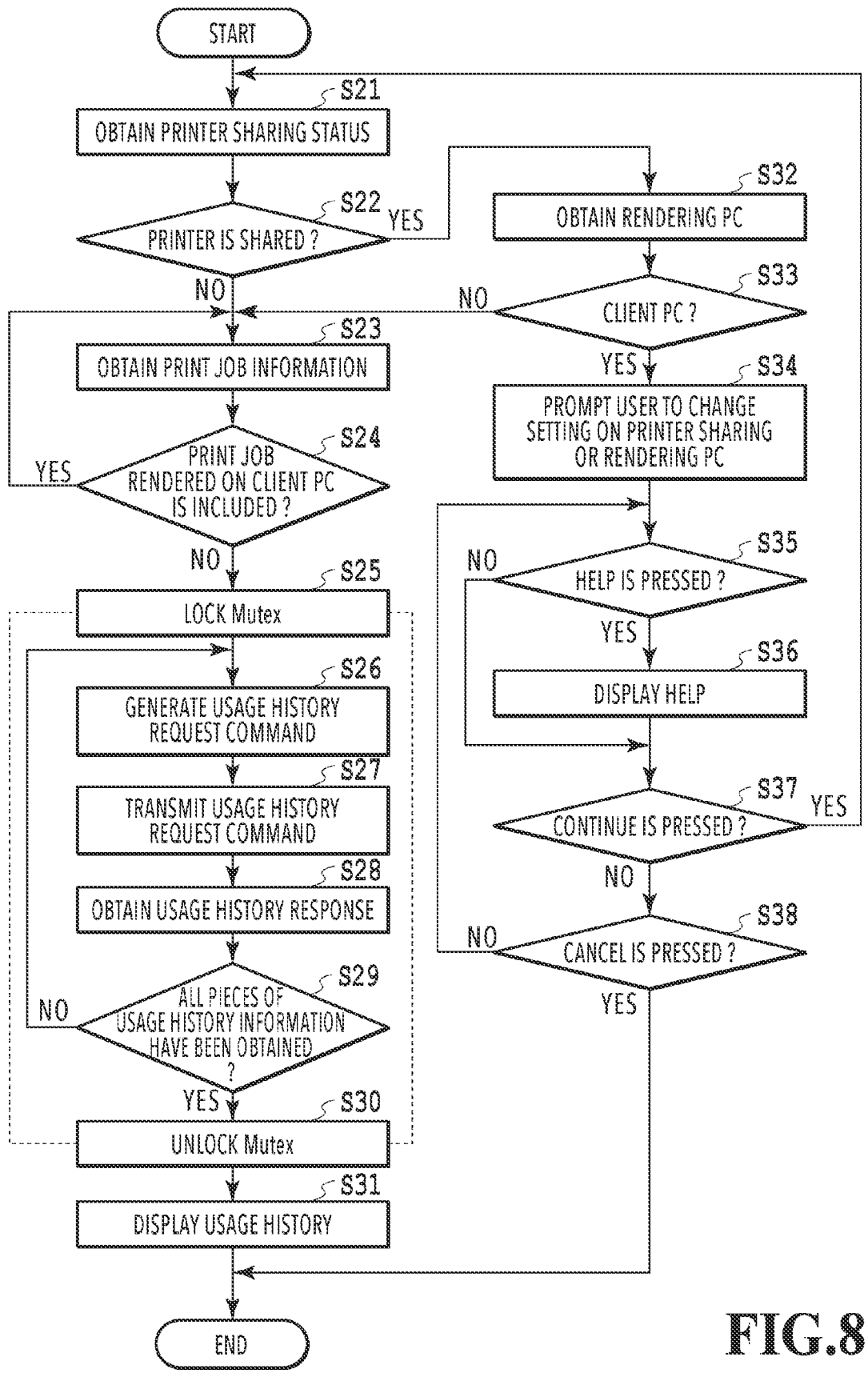
FIG. 8 is a flowchart showing processing executed by a management tool of the server PC.

FIG. 8 is a flowchart illustrating status information obtaining processing executed by the management tool 6 of the server PC 1. This processing is started once a user presses the Display History box 63 illustrated in FIG. 6.

Once the processing is started, in S21 the management tool 6 obtains printer sharing status information from the OS. The information obtained here is information set on the settings screen 50 illustrated in FIG. 5. Thus, out of the printers connected, sharing information on the printer for which the check box 51 is checked is provided to the management tool 6.

In S22, the management tool 6 determines based on the sharing information obtained in S21 whether the target printer is set to be shared. If the management tool 6 determines that the target printer is not set to be shared, the management tool 6 proceeds to S23 to obtain, from the OS, information on a list of print jobs currently being processed or waiting to be processed by the server PC 1.

In S24, referring to the list information obtained in S23, the management tool 6 determines whether the print jobs currently being processing or waiting to be processed include a print job rendered by the client PC 40. Specifically, the management tool 6 compares the name of itself (the server PC 1) with the names of the PCs in the list information and thereby determines whether the print jobs include any print job rendered by a PC other than the server PC 1.

In a case where the list includes a print job rendered by the client PC 40, the management tool 6 cannot allow a mutex to function between the management tool 6 and the filter 43 of the client PC 40. Thus, once the management tool 6 starts the above-described usage history information obtaining processing, there is concern that the management tool 6 and the spooler 3 may transmit or receive information via the USB I/F 7 in a mixed manner. To avoid this risk, in the present embodiment, the management tool 6 repeats Steps S23 and S24 until it is determined in S24 that the list does not include any print job rendered by the client PC 40.

If the management tool 6 determines in S24 that the print jobs currently being processing or waiting to be processed does not include a print job rendered by the client PC 40, the management tool 6 proceeds to S25 to lock the mutex in order to obtain the usage history information on the printer A 30. If the filter 4 of the server PC 1 is executing the processing illustrated in FIG. 7, the mutex has been locked by the filter 4. Thus, the management tool 6 waits for the mutex to be unlocked by the filter 4 and locks the mutex once the mutex is unlocked.

In S26, the management tool 6 generates a command for requesting the printer A 30 for its usage history. In S27, the management tool 6 transmits the usage history request command generated in S26 to the printer A 30 via the USB I/F 7. In S28, the management tool 6 obtains usage history information from the printer A 30 via the USB I/F 7. In S29, the management tool 6 determines whether all the pieces of usage history information have been obtained. If the management tool 6 determines that there is still a piece of history information to be obtained, the management tool 6 returns to S26 to generate a new command. If the management tool 6 determines that all the pieces of usage history information have been obtained, the management tool 6 proceeds to S30 and unlocks the mutex.

Then, in S31, the management tool 6 displays the usage history display screen 60 like the one shown in FIG. 6 on the display device 106 based on the usage history information obtained in S25 to S30. The processing is thus ended.

On the other hand, if the management tool 6 determines in S22 that the printer is set to be shared, the management tool 6 proceeds to S32 to obtain, from the OS, information on the PC set to perform rendering. The information obtained here is information set on the settings screen 50 illustrated in FIG. 5.

In S33, the management tool 6 determines whether the PC set to perform rendering is the client PC 40. If the PC set to perform rendering is not the client PC 40, i.e., is the server PC 1, the management tool 6 proceeds to S23 to obtain and display a usage history of the printer A 30 in the steps S23 to S31 already described. If the PC set to perform rendering is the client PC 40, the management tool 6 proceeds to S34.

If the PC set to perform rendering is the client PC 40, the management tool 6 cannot make the mutex function between the management tool 6 and the filter 43 of the client PC 40. Thus, once the management tool 6 starts the processing for obtaining usage history information, there is concern that the management tool 6 and the spooler 3 may transmit or receive information via the USB I/F 7 in a mixed manner. To avoid this risk, the management tool 6 of the present embodiment temporarily stops the processing to obtain the usage history of the printer A 30 in a case where the PC set to perform rendering is set to a PC other than the server PC 1. Then, the management tool 6 performs processing to prompt the user to cancel the setting to share the printer A 30 or change the PC set to perform rendering to the server PC 1. In the present embodiment, a mode where the setting to share the printer A 30 is cancelled is a state where although communications between the printer A 30 and the server PC 1 is allowed, communications between the printer A 30 and another apparatus via the server PC 1 is not allowed. In other words, in a state where the server PC 1 does not share the printer A 30 with a different apparatus (the setting to share is cancelled), the server PC 1 does not transfer data transmitted from the different apparatus to the printer A 30.

Figure 9A:
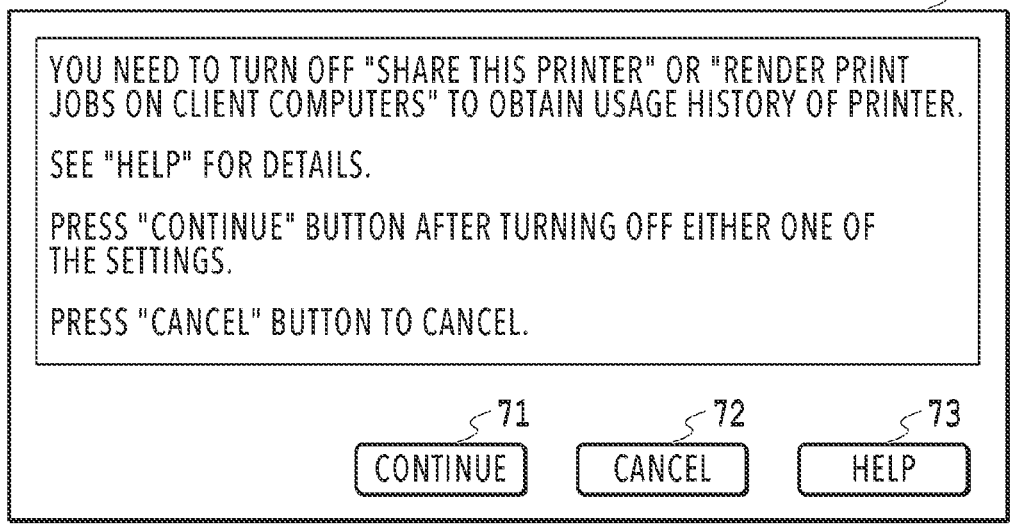
FIGS. 9A and 9B are diagrams each showing a guidance dialog.
Figure 9B:
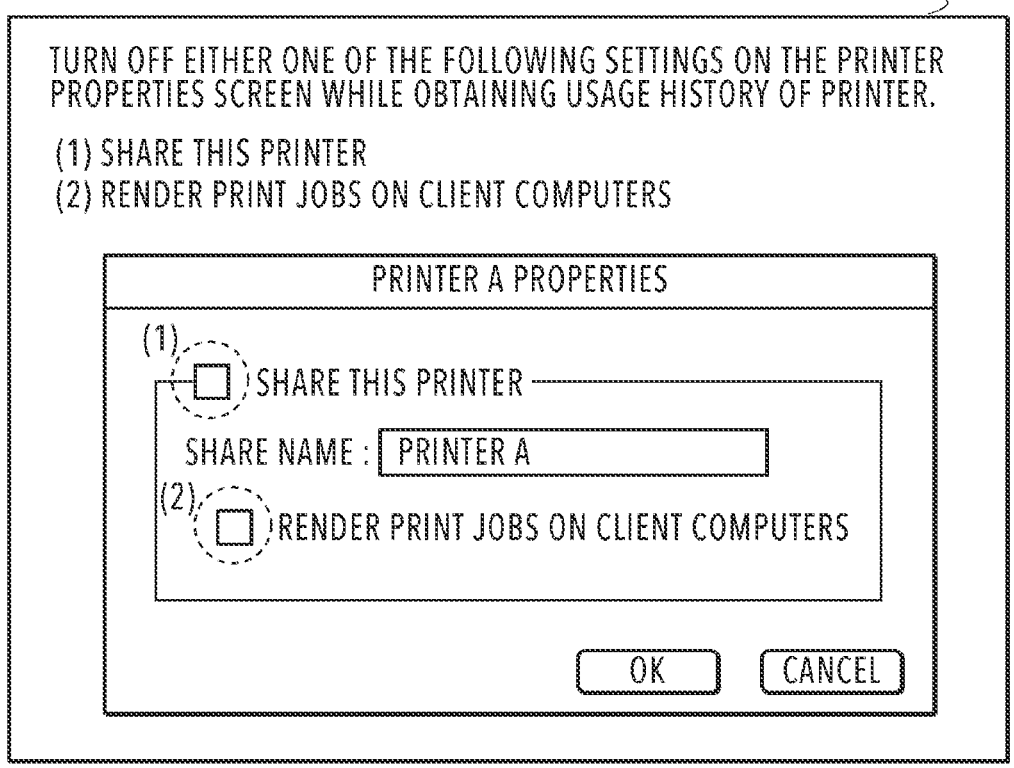

FIGS. 9A and 9B show guidance dialogs displayed by the management tool 6 in S34 and S36 in FIG. 8 to the user.

In S34, the management tool 6 displays a guidance dialog 70 shown in FIG. 9A. Given in the guidance dialog 70 is a guidance to cancel the printer sharing setting or change the PC set to perform rendering to the server PC 1. The guidance dialog 70 is closed once a user presses any one of a Continue button 71, a Cancel button 72, and a Help button 73.

If the management tool 6 determines in S35 that the Help button 73 has been pressed, the management tool 6 proceeds to S36 to display a guidance dialog 75 shown in FIG. 9B. Presented in the guidance dialog 75 are details on how to cancel the printer sharing setting or how to change the PC set to perform rendering to the server PC. By following the above guidance dialogs 70, 75 and opening the settings screen 50 illustrated in FIG. 5, the user can change the setting on sharing the printer A 30 and the setting on a PDL generating PC.

If the management tool 6 determines in S37 that the Continue button 71 has been pressed, the management tool 6 returns to S21. In this event, in a case where the user has already changed the setting according to the guidance dialogs 70, 75, the management tool 6 can perform the processing to obtain and display the usage history of the printer A 30 smoothly according to S23 to S31 already described. A case is conceivable where a print job is received from the client PC 40 before the management tool 6 checks pressing on the Continue button 71 in S37. However, even in such a case, the management tool 6 repeats the steps S23 and S24 until it is determined in S24 that the list does not include a print job rendered by the client PC 40. Thus, data communications performed regarding the print job rendered by the client PC 40 and data communications performed by the management tool 6 do not occur in a mixed manner.

If the management tool 6 determines in S38 that the Cancel button 72 has been pressed, the management tool 6 ends this processing.

According to the present embodiment described above, in a case where the filter that generates a PDL is the filter 4 operating on the server PC 1, mutual exclusion using a mutex helps to prevent data communications by the filter 4 and data communications by the management tool 6 from occurring in a mixed manner. In a case where the filter that generates a PDL is the filter 43 operating on the client PC 40, the management tool 6 suspends its processing and performs processing to prompt a user to cancel the setting to share the printer A 30 or change the PC set to perform rendering to the server PC 1. This helps to prevent information for different programs from being transmitted or received via the USB I/F 7 in a mixed manner and allows printing processing to be performed properly.

Second Embodiment

The present embodiment also uses the print system illustrated in FIGS. 1 to 6. In the present embodiment, the management tool 6 of the server PC 1 performs the processing to obtain the usage history of the printer A 30 while monitoring the processing status of the spooler 3 of the server PC 1.

Figure 10B:
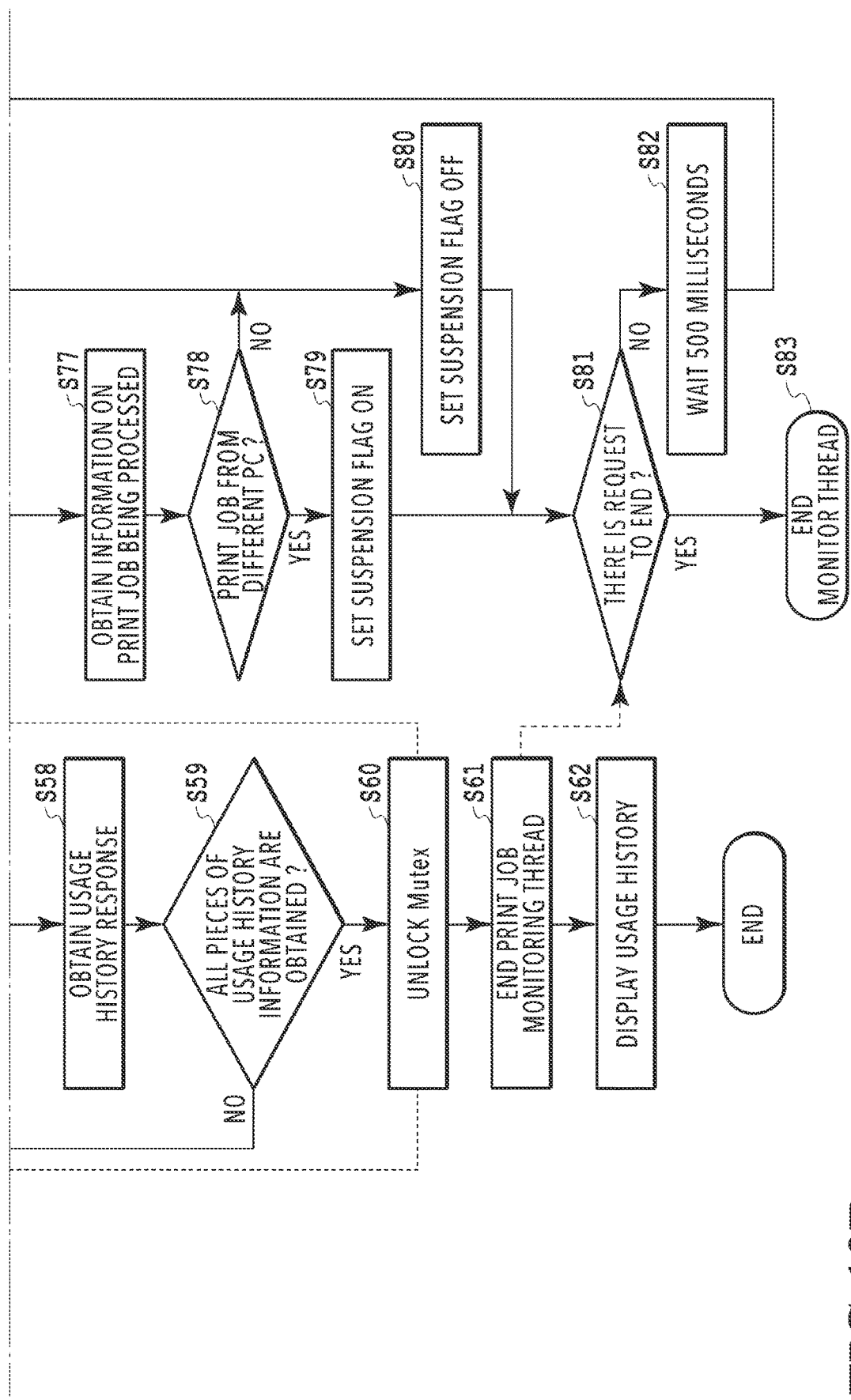

FIGS. 10A and 10B shows a flowchart illustrating status information obtaining processing executed by the management tool 6 of the server PC 1 of the present embodiment. This processing is started at the timing at which the Display History box 63 illustrated in FIG. 6 is pressed by a user.

Once this processing is started, in S51 the management tool 6 first sets a suspension flag on as default. The suspension flag is a flag used to determine whether it is fine for the management tool 6 to perform the processing to obtain information on the usage history of the printer A 30.

In S52, the management tool 6 activates a monitor thread for a print job. After that, the management tool 6 performs the steps S53 to S62 of a main thread and the steps S70 to S82 of the monitor thread concurrently.

First, the main thread is described. In S53, the management tool 6 locks the mutex. In a case where the mutex has already been locked by the filter 4, the management tool 6 waits until the filter 4 unlocks the mutex and locks the mutex after the mutex is unlocked.

In S54, the management tool 6 checks the suspension flag. In S55, the management tool 6 determines whether the suspension flag is off. In a case where the management tool 6 starts the usage history information obtaining processing with the suspension flag being set on, there is concern that the management tool 6 and the spooler 3 may transmit or receive information via the USB I/F 7 in a mixed manner. To avoid this risk, the management tool 6 waits until it is determined in S55 that the suspension flag is off while repeating the steps S54 and S55.

After determining in S55 that the suspension flag is off, the management tool 6 starts the usage history information obtaining processing. The steps S56 to S60 performed after that to obtain the usage history information are the same as the steps S26 to S30 illustrated in FIG. 8 and are therefore not described here.

In S61, the management tool 6 requests to end the monitor thread activated in S52. In S62, the management tool 6 displays the usage history display screen 60 like the one shown in FIG. 6 on the display device 106 based on the usage history information obtained in S56 to S59, and then ends the processing.

Meanwhile, after activating the monitor thread in S52, in S71 the management tool 6 first obtains printer sharing status information from the OS. The information obtained here is information set on the settings screen 50 illustrated in FIG. 5.

In S72, the management tool 6 determines based on the information obtained in S71 whether the target printer is set to be shared. If the management tool 6 determines that the target printer is not set to be shared, the management tool 6 proceeds to S80 and sets the suspension flag off. If the management tool 6 determines that the target printer is set to be shared, the management tool 6 proceeds to S73.

In S73, the management tool 6 obtains information on the PC set to perform rendering from the OS. The information obtained here is information set on the settings screen 50 illustrated in FIG. 5.

In S74, the management tool 6 determines whether the PC set to perform rendering is the client PC 40. If the PC set to perform rendering is not the client PC 40, i.e., is the server PC 1, the management tool 6 proceeds to S80 and sets the suspension flag off. If the PC set to perform rendering is the client PC 40, the management tool 6 proceeds to S75.

In S75, the management tool 6 obtains the print job processing status in the server PC 1 from the OS.

In S76, the management tool 6 determines whether the server PC 1 is currently processing a print job, and if the server PC 1 is not currently processing any print job, proceeds to S80 to set the suspension flag off. If the server PC 1 is currently processing a print job, the management tool 6 proceeds to S77.

In S77, the management tool 6 obtains information on the print job currently being processed by the server PC 1 from the OS. The information on the print job includes, for example, the name of the PC that generated the job. Even in a case where a PDL is generated by the client PC 40, the OS of the client PC 40 sends the information on the print job to the server PC 1 before generating the PDL. Thus, the management tool 6 of the server PC 1 can obtain the information on the print job before the filter 43 of the client PC 40 generates a PDL.

In S78, the management tool 6 determines whether the print job currently being processed by the server PC 1 is a print job created in a PC other than the server PC 1. Specifically, the management tool 6 makes the determination by comparing the name of the PC that generated the print job with the name of the server PC 1. If the management tool 6 determines that the print job currently being processed is a print job created in the server PC 1, the management tool 6 proceeds to S80 and sets the suspension flag off. If the management tool 6 determines that the print job currently being processed is a print job created in a PC other than the server PC 1, the management tool 6 proceeds to S79.

In S79, the management tool 6 sets the suspension flag on.

In S81, the management tool 6 determines whether there is a request from the main thread to end the monitor thread. If there is no request, the management tool 6 proceeds to S82 to wait for 500 milliseconds, and then returns to S71. If there is a request to end the monitor thread, the management tool 6 ends the monitor thread.

According to the flowchart illustrated in FIGS. 10A and 10B, in the main thread, the management tool 6 performs the steps S56 to S59 for obtaining information on the usage history of the printer A 30 while checking if the suspension flag is off. In a case where the suspension flag is on, the management tool 6 waits until the suspension flag is set off while repeating the steps S54 and S55. In other words, the management tool 6 obtains information on the usage history of the printer A 30 in stages by repeating the step of checking the suspension flag, the step of waiting until the suspension flag is set off, and the step of obtaining usage history information.

Meanwhile, in the monitor thread performed concurrently with the main thread, the management tool 6 sets the suspension flag on only in a case where the determination results in S72, S74, S76, and S78 are all Yes. In other words, the management tool 6 sets the suspension flag on only in a case where a print job rendered by the client PC 40 is being processed by the server PC 1. In other cases, the management tool 6 sets the suspension flag off because mutual exclusion using the mutex effectively functions between the management tool 6 and the filter 4 of the server PC 1. The management tool 6 performs such an update of the suspension flag every 500 milliseconds.

Figure 11:
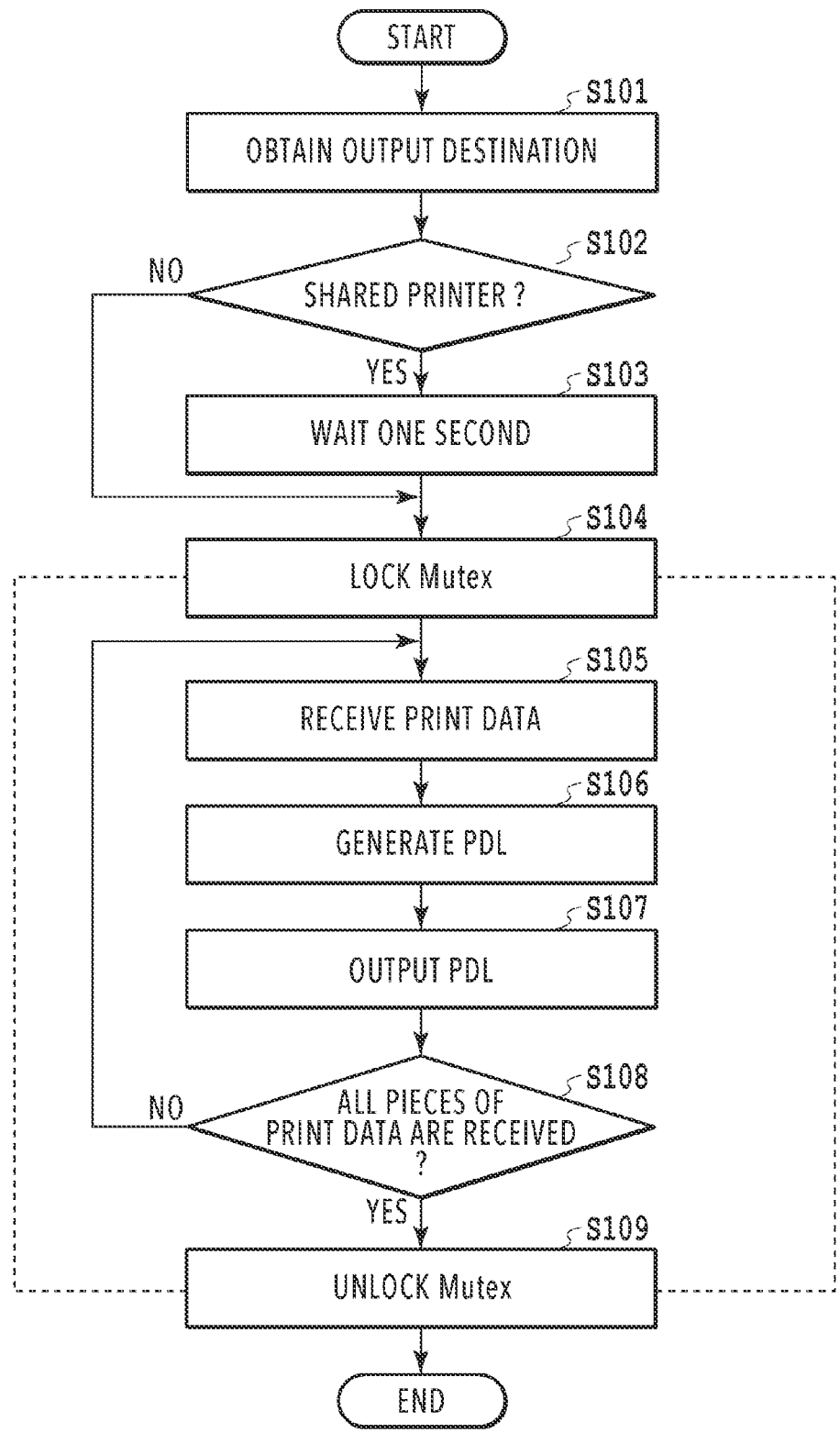
FIG. 11 is a flowchart showing processing executed by a filter of the client PC.

FIG. 11 is a flowchart illustrating processing executed by the filter 43 of the client PC 40 in a case where the client PC 40 generates a PDL. This processing is started by the spooler 42 activating the filter 43 based on receiving a print job generated by the application 41.

Once this processing is started, in S101 the filter 43 first obtains, from the OS of the client PC 40, an output destination of the print job.

In S102, the filter 43 determines whether the output destination of the print job is a shared printer connected to a different PC. If the filter 43 determines that the output destination of the print job is a shared printer, the filter 43 waits one second in S103 and then proceeds to S104 to start PDL conversion and output of the print data. If the filter 43 determines that the output destination of the print job is not a shared printer, the filter 43 proceeds to S104 without waiting and starts converting and outputting a PDL of the print data. The steps S104 to S109 performed after that for PDL conversion and output of the print data are the same as the steps S11 to S16 illustrated in FIG. 7, and are therefore not described here.

Now, a comparison is made between the flowchart in FIGS. 10A and 10B executed by the management tool 6 of the server PC 1 and the flowchart in FIG. 11 executed by the filter 43 of the client PC 40. In a case where the output destination of the print job is a shared printer, the client PC 40 starts generating a PDL after waiting for one second. By contrast, the server PC 1 determines every 500 milliseconds whether it is fine to update the suspension flag, i.e., to perform the processing to obtain the information on the usage history of the printer A 30. Thus, in a case where the output destination of the print job is a shared printer, the management tool 6 of the server PC 1 can detect that the server PC 1 has received the print job from the client PC 40 before the spooler 3 receives a PDL from the client PC 40. In other words, the management tool 6 sets the suspension flag on (S79) before the spooler 3 receives a PDL from the client PC 40 and can wait until the processing for the print job created in the client PC 40 ends. Although the configuration described above is such that the client PC 40 starts generating a PDL after waiting for one second and the suspension flag is updated every 500 milliseconds, these numbers can be changed as long as the suspension flag is updated at predetermined intervals which is shorter than the period of time in which the client PC 40 waits.

The present embodiment described above helps to prevent information for different programs from being transmitted or received via the USB I/F 7 in a mixed manner and enables printing processing to be performed properly without the user having to change the settings as in the first embodiment.

Third Embodiment

The present embodiment also uses the print system illustrated in FIGS. 1 to 6. In the present embodiment, the management tool 6 of the server PC 1 performs the processing to obtain the usage history of the printer A 30 while changing the settings of the print system as needed.

Figure 12B:
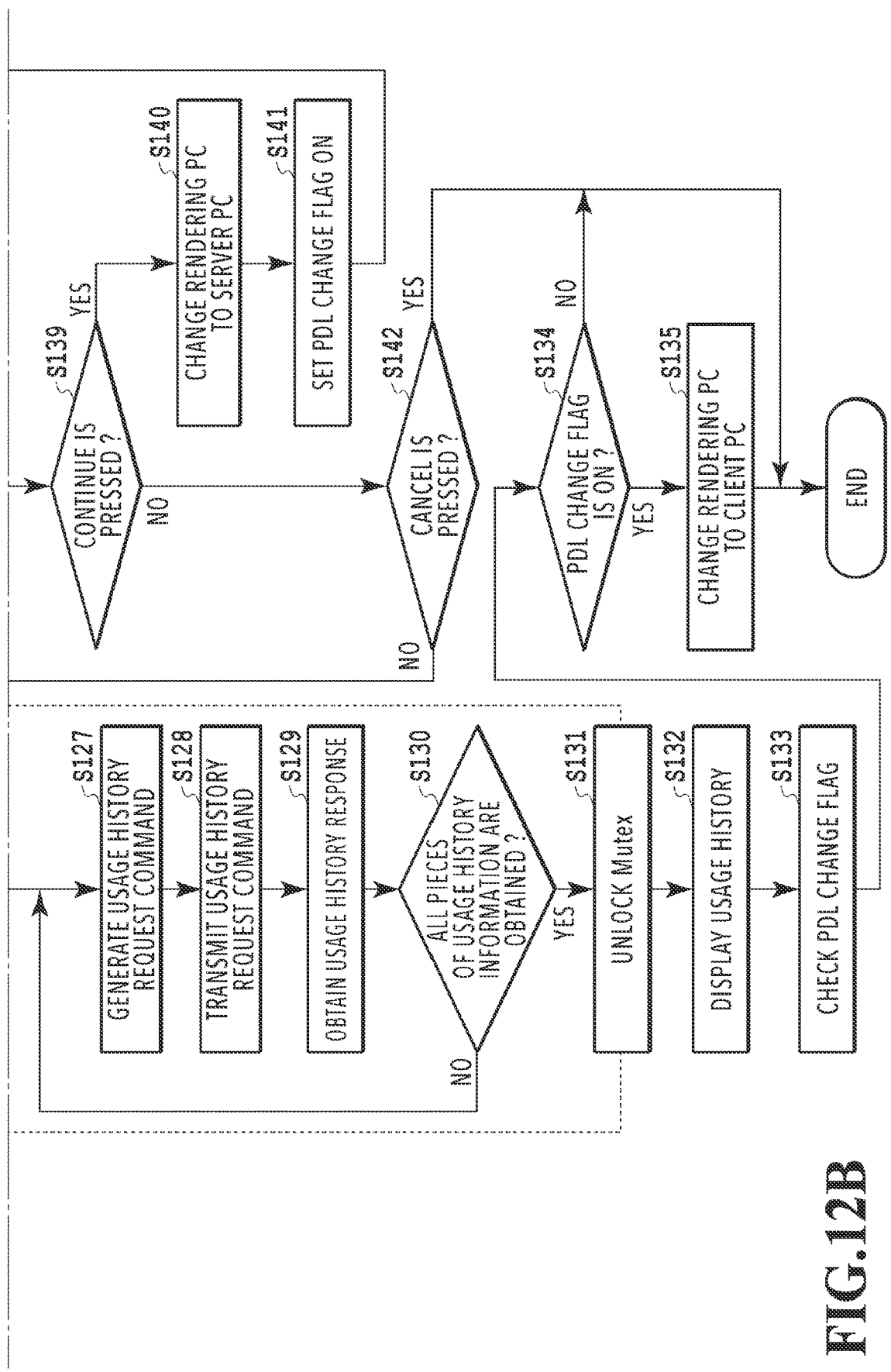

FIGS. 12A and 12B show a flowchart illustrating status information obtaining processing executed by the management tool 6 of the server PC 1 of the present embodiment.

This processing is started at the timing at which the Display History box 63 illustrated in FIG. 6 is pressed by a user.

Once this processing is started, in S121 the management tool 6 first sets a PDL change flag off as default. The PDL change flag is a flag for indicating that a PC set to perform rendering has been changed from a client PC 40 to a server PC 1. The steps S122 to S132 performed after that for obtaining and displaying usage history information are the same as the steps S21 to S31 illustrated in FIG. 8 and are therefore not described here.

In S133, the management tool 6 obtains information on the PDL change flag.

In S134, the management tool 6 determines whether the PDL change flag is on. If the PDL change flag is on, the management tool 6 proceeds to S135 to change the PC set to perform rendering from the server PC 1 back to the client PC 40, and ends this processing. If the management tool 6 determines in S134 that the PDL change flag is off, the management tool 6 ends this processing.

If the management tool 6 determines in S123 that the printer is set to be shared, the management tool 6 proceeds to S136 and obtains information on the PC set to perform rendering from the OS. The information obtained here is information set on the settings screen 50 illustrated in FIG. 5.

In S137, the management tool 6 determines whether the PC set to perform rendering is the client PC 40. If the PC set to perform rendering is not the client PC 40, i.e., is the server PC 1, the management tool 6 proceeds to S124 and follows the already-described steps S124 to S135 to perform the processing to obtain and display the usage history of the printer A 30. If the management tool 6 determines in S137 that the PC set to perform rendering is the client PC 40, the management tool 6 proceeds to S138.

Figure 13:
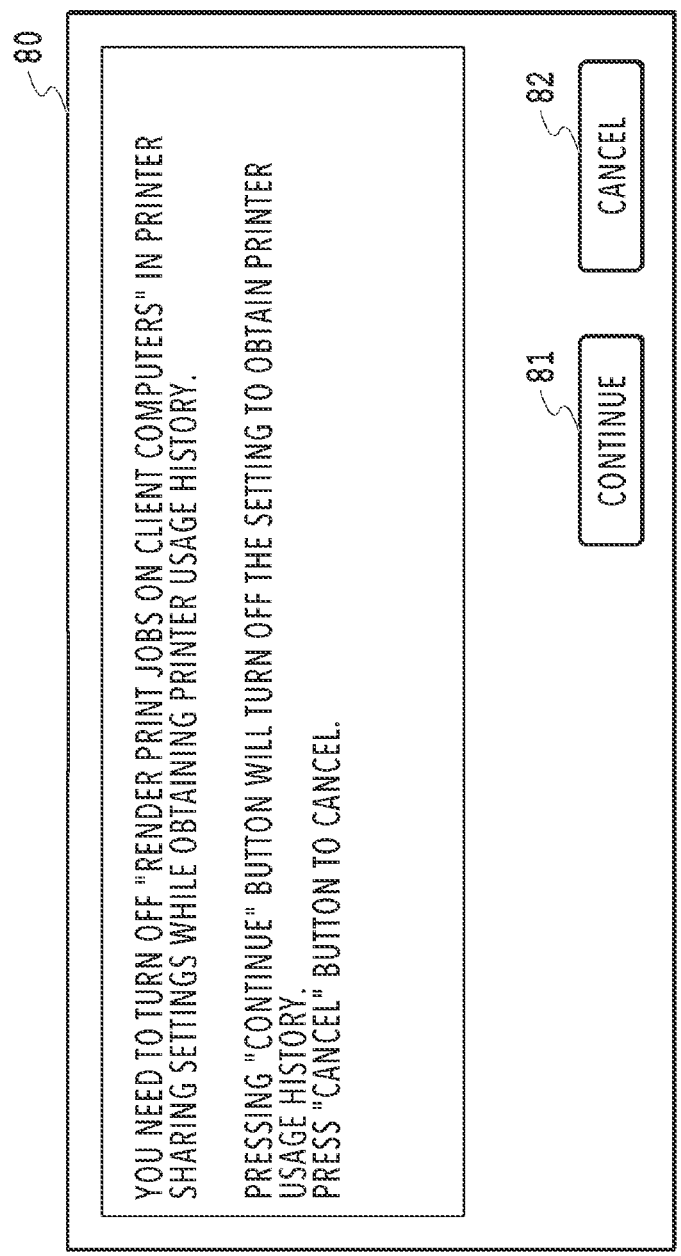
FIG. 13 is a diagram showing a notification dialog.

In S138, the management tool 6 displays a notification dialog 80 shown in FIG. 13. The notification dialog 80 gives a notification to change the PC set to perform rendering to the server PC 1. The notification dialog 80 is closed by a user's pressing a Continue button 81 or a Cancel button 82.

If the management tool 6 determines in S139 that the Continue button 81 has been pressed, the management tool 6 changes the PC set to perform rendering from the client PC 40 to the server PC 1 in S140, sets the PDL change flag on in S141, and then returns to S136.

In a case where the management tool 6 returns to S136 after determining in S139 that the Continue button 81 has been pressed, it is determined in S137 that the PC set to perform rendering is not the client PC 40. Thus, the management tool 6 proceeds to S124 and can perform processing to obtain and display the usage history of the printer A 30. In this event, it is conceivable that a print job may be received from the client PC 40 before the management tool 6 switches the rendering PC to the server PC 1 in S140. However, even in such a case, the management tool 6 waits while repeating the steps S124 and S125 until it is determined in S125 that a print job rendered by the client PC 40 is not included. Thus, data communications performed regarding a print job rendered by the client PC 40 and data communications performed by the management tool 6 do not occur in a mixed manner.

If the management tool 6 determines in S142 that the Cancel button 82 has been pressed, the management tool 6 ends this processing without changing the PC set to perform rendering.

According to the present embodiment described above, the management tool 6 can perform processing to obtain the usage history of the printer A 30 while changing the PC set to perform rendering processing as needed. Specifically, in a case where the PC set to perform rendering processing is set to the client PC 40, the PC set to perform rendering processing is set to the server PC 1 in a period during which the management tool 6 is performing the history information obtaining processing, and is changed back after the history information obtaining processing has ended. Thereby, without putting a user to the trouble of changing the setting of the rendering PC back, the present embodiment helps to prevent the spooler 3 and the management tool 6 from transmitting or receiving information in a mixed manner and enables printing processing to be performed properly.

OTHER EMBODIMENTS

Although the server PC 1 and the printer A 30 are connected to each other via an interface in the first to third embodiments described above, the server PC 1 and the printer A 30 may be an integral apparatus.

Although the above describes mutual exclusion between the printer driver and the management tool 6, the processing of the present disclosure may be executed for mutual exclusion between the printer driver and a different program. For example, the processing of the present disclosure may be executed for mutual exclusion between the printer driver and a program for communicating with the printer, the program being not the management tool 6.

The present disclosure provides a system or an apparatus with a storage medium storing program code of software implementing the functions described in the above embodiments so that a computer in the system or apparatus reads and executes the program code. In this case, the program code read from the storage medium implements the functions of the embodiments described above, and the storage medium storing the program code forms the present disclosure.

Examples of a storage medium usable for providing program code include a flexible disk, a hard disk, an optical disk, a magneto-optical disk, a CD-ROM, a CD-R, a magnetic tape, a non-volatile memory card, a ROM, and a DVD.

Instead of the functions of the embodiments described above being implemented by a computer executing program code, the OS running on the computer or the like may perform part or all of the actual processing based on the instructions in the program code.

Also, a mode may be employed such that program code read from a storage medium is written into a memory in an extension board inserted into a computer or in an extension unit connected to a computer. In this case, the present disclosure also includes a mode where a CPU or the like in the extension board or unit performs part or all of the actual processing based on the instructions in the program code written, and the functions of the above present embodiments are implemented by such processing.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-099470, filed Jun. 8, 2020, which is hereby incorporated by reference wherein in its entirety.

What is claimed is:

1. An information processing method executed by a first information processing apparatus capable of communicating with a printer in a print system in which the first information processing apparatus and a second information processing apparatus capable of communicating with the printer via the first information processing apparatus are connected via a network, the information processing method comprising:
   obtaining setting information on communications of the printer;
   obtaining information on a status of the printer from the printer by communicating with the printer, the obtaining the information on the status of the printer being started based on an input of a command from a user; and
   executing predetermined processing while waiting to communicate with the printer, in a case where the setting information indicates that the printer is ready to communicate with the second information processing apparatus via the first information processing apparatus and that the second information processing apparatus generates a printer description language (PDL) based on print data,
   wherein the obtaining of the information on the status of the printer and the executing of the predetermined processing are executed by respective different programs on the first information processing apparatus.

2. The information processing method according to claim 1, wherein the predetermined processing is processing to prompt a user to change a setting in the setting information.

3. The information processing method according to claim 2, wherein the predetermined processing is processing to prompt the user to change the setting in the setting information such that communications are not allowed between the printer and the second information processing apparatus or such that the first information processing apparatus generates the PDL that the printer is to receive.

4. The information processing method according to claim 1, wherein the predetermined processing is processing to check a flag which is set on in a case where the printer is ready to communicate with the second information processing apparatus via the first information processing apparatus, the second information processing apparatus is set to generate the PDL, and the first information processing apparatus is processing the PDL generated by the second information processing apparatus.

5. The information processing method according to claim 4,
   wherein in the executing the predetermined processing, the predetermined processing is repeated until it is confirmed that the flag is off, and
   wherein once it is confirmed that the flag is off, the communications with the printer for obtaining the information on the status of the printer is started.

6. The information processing method according to claim 4, wherein whether the flag is on or off is repeatedly determined at predetermined intervals.

7. The information processing method according to claim 1,
   wherein the predetermined processing is processing to change a setting in the setting information such that the first information processing apparatus generates the PDL, and
   wherein the communications with the printer for obtaining the information on the status of the printer is started after the change is made.

8. The information processing method according to claim 7, further comprising:
   changing a setting in the setting information again such that the second information processing apparatus generates the PDL, after the information on the status of the printer is obtained from the printer.

9. The information processing method according to claim 1, wherein the communications with the printer for obtaining the information on the status of the printer is started in a case where it is confirmed that print jobs currently processed or waiting to be processed by the first information processing apparatus do not include a job with a PDL generated by the second information processing apparatus.

10. The information processing method according to claim 1, wherein the obtaining the information on the status of the printer includes transmitting a command for requesting for a usage history to the printer, receiving the usage history from the printer, and displaying the received usage history.

11. The information processing method according to claim 1, wherein the predetermined processing is executed by a printer driver.

12. A non-transitory computer-readable storage medium including program instructions, which when executed by a computer of a first information processing apparatus, cause the first information processing apparatus to perform the following:
   obtaining setting information on communications of a printer;
   obtaining information on a status of the printer from the printer by communicating with the printer, the obtaining the information on the status of the printer being started based on an input of a command from a user; and
   executing predetermined processing while waiting to communicate with the printer, in a case where the setting information indicates that the printer is ready to communicate with a second information processing apparatus via the first information processing apparatus and that the second information processing apparatus generates a printer description language (PDL) based on print data, wherein the obtaining of the information on the status of the printer and the executing of the predetermined processing are executed by respective different programs on the first information processing apparatus.

13. An information processing apparatus which is interposed between a printer and a different information processing apparatus which is connected to the information processing apparatus via a network and which is capable of controlling communications between the printer and the different information processing apparatus, the information processing apparatus comprising:

a setting information obtaining unit that obtains setting information on communications of the printer;

a status information obtaining unit that obtains information on a status of the printer from the printer by communicating with the printer based on an input of a command from a user; and an execution unit that causes the status information obtaining unit to wait to communicate with the printer and executes predetermined processing in a case where the setting information indicates that the printer is ready to communicate with the different information processing apparatus via the information processing apparatus and that the different information processing apparatus generates a printer description language (PDL) based on print data, wherein the obtaining of the information on the status of the printer by the status information obtaining unit and the executing of the predetermined processing by the execution unit are executed by respective different programs on the information processing apparatus.

* * * * *